Sept. 19, 1967  J. W. PARKS ETAL  3,342,138
LIQUID LEVEL INDICATOR
Filed Aug. 12, 1965
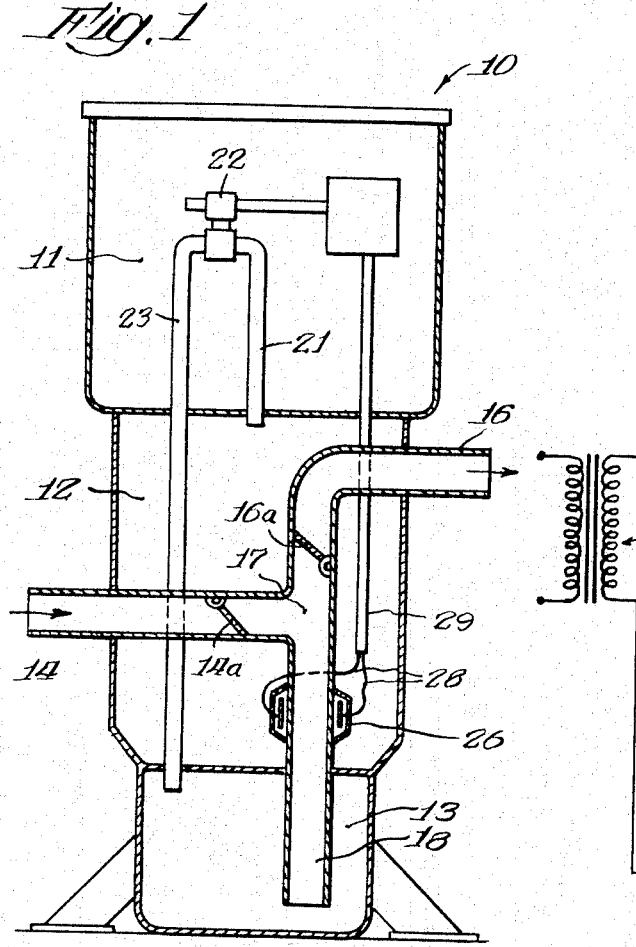
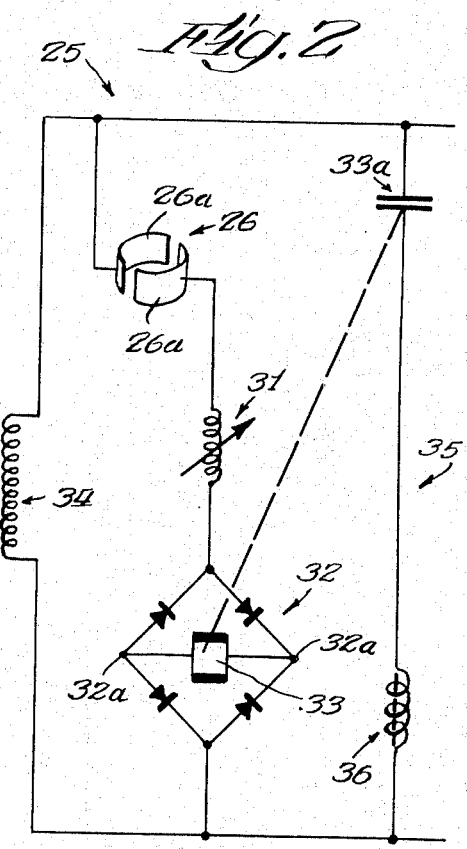
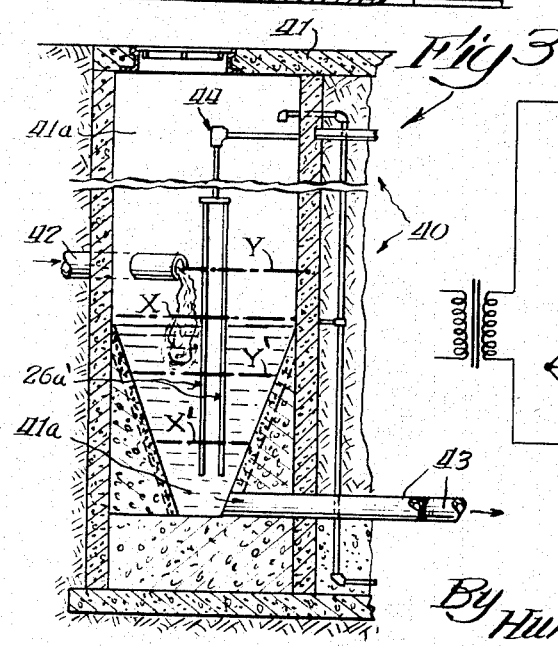
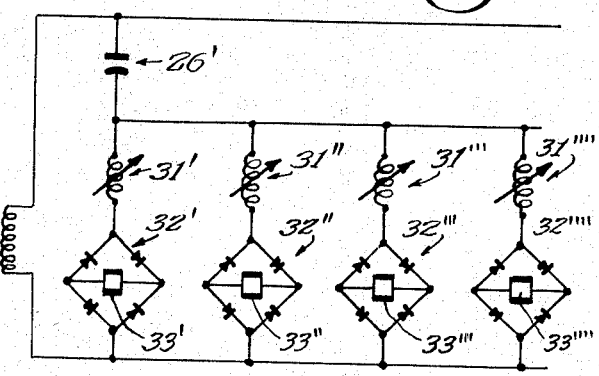
Inventor:
John W. Parks
Philip R. Shafer
By Hume, Groen, Clement & Hume
Attys

United States Patent Office 3,342,138
Patented Sept. 19, 1967

3,342,138
LIQUID LEVEL INDICATOR
John W. Parks, Overland Park, and Philip R. Shafer, Shawnee Mission, Kans., assignors to Union Tank Car Company, Chicago, Ill., a corporation of New Jersey
Filed Aug. 12, 1965, Ser. No. 479,206
6 Claims. (Cl. 103—240)

ABSTRACT OF THE DISCLOSURE

Controlled sewage handling apparatus having a sewage receiving chamber and either a pump or pneumatic means for discharging sewage from the receiving chamber when the liquid level therein reaches a pre-selected point. A sensing capacitor is positioned so that its impedance varies in accordance with the liquid level in the sewage receiving chamber. The capacitor is connected in series with a variable inductor and a relay coil, and this series circuit is connected across a current source. The variable inductor is adjusted so that the series circuit will resonate when the liquid level in the sewage receiving chamber reaches the pre-selected point. When this occurs, the series circuit will present a minimum impedance, the relay coil will be energized, and a relay contact will close in an energization circuit for the pump or pneumatic discharge means.

---

This invention relates to sewage handling apparatus, and more particularly to controlled sewage handling apparatus.

It is an object of the invention to provide an improved form of controlled sewage handling apparatus that is both highly reliable and efficient in operation.

Still another object of the invention is to provide a sewage discharge control for sewage handling apparatus which control is adapted to be preconditioned to respond to a selected level of liquid within a sewage receiver so as to effect the controlled discharge of the liquid from the receiver (e.g. due to the controlled actuation of either a pneumatic ejection or a pump discharge means).

A further object of the present invention is to provide a responsive control circuit which reliably effects the controlled operation of sewage handling apparatus without being inhibited by the adverse conditions which in the past have precluded the completely satisfactory utilization of probe-type controls and the like.

Other objects and advantages of the present invention will become apparent from the following detailed description of two preferred embodiments thereof, particularly when considered in conjunction with the accompanying drawings wherein:

FIGURE 1 is a simplified, diagrammatic representation of sewage handling apparatus employing one embodiment of the sewage discharge control of the present invention;

FIGURE 2 is a schematic illustration of a discharge control circuit as employed with the apparatus depicted in FIGURE 1;

FIGURE 3 is a simplified view of an alternate form of sewage handling apparatus adapted with a discharge control of the present invention; and FIGURE 4 is a schematic illustration of an alternate embodiment of the discharge control circuit as employed with the apparatus depicted in FIGURE 3.

Referring generally to the drawings, the present invention is directed to sewage handling apparatus wherein the discharge of accumulated sewage is automatically effected by a level responsive, discharge control circuit. Preferably, the sewage discharge control circuits utilize one or more variable impedance networks to control the operation of the ejecting mechanism associated with the sewage handling apparatus. In this connection, a variable impedance sensing element, which forms a part of the impedance network, is exposed to the liquid confined within the sewage receiving receptacle of the apparatus so that the impedance of this sensing element varies in direct response to variations in the liquid level above a preselected point. As the impedance of the sensing element reaches a preset value the control circuit operates the discharge mechanism (e.g., a pneumatic ejector or pump discharge means) of the sewage handling apparatus so as to effect the controlled discharge of liquid from the sewage receiving receptacle.

Referring more specifically to FIGURE 1, the diagrammatically illustrated sewage handling apparatus, may, for example, be of the type disclosed and claimed in the United States Letters Patent No. 2,817,299. Generally, this combined receiving, handling and ejecting apparatus includes a housing 10 that defines an enclosed machinery chamber 11, an air storage chamber 12, and a sewage receiving receptacle 13. In a conventional manner, the housing 10 accommodates the passage of an inlet pipe or conduit 14 through a portion of the wall that defines the air storage chamber 12. Similarly, another portion of this chamber defining wall is suitably constructed so as to facilitate the passage of a discharge pipe or conduit 16 therethrough. In the illustrated embodiment, the conduits 14 and 16 merge at a T-like coupling or connecting joint 17 with a sewage conduit 18 that serves the dual function of directing sewage into the receiving receptacle 13 and handling the discharge of sewage from the receptacle. Preferably, the conduits 14 and 16 include conventional check valves 14a and 16a, respectively.

In addition to the housing and the piping arrangement, which effects the transmission of the sewage into and out of the receiving receptacle 13, the apparatus of FIGURE 1 also includes a selectively actuable pressurizing system for creating a pressure head within the receptacle 13 when it is desired to discharge sewage therefrom and through the discharge conduit 16. The pressurizing system includes a conduit 21 that communicates with the air storage chamber 12 and with the inlet side of a solenoid valve 22. The outlet side of the solenoid valve 22 communicates with the upper region of the receptacle 13 through a conduit 23 as shown in FIGURE 1.

The solenoid valve 22, which also includes a conventional venting port, and a portion of the piping arrangement associated therewith is preferably located in the machinery chamber 11 as is the major portion of the circuit 25 (FIGURE 2) that dictates the controlled actuation of the normally closed solenoid valve. In this connection, the control circuit 25 preferably includes a capacitive type sensing element that is mounted in association with the pipe or conduit 18, preferably either beneath or in the coupling or connecting joint 17 and above the top of the receptacle 13. The capacitive type sensing element 26 is preferably formed by a pair of plate members 26a that are mounted in a non-conductive segment of the conduit 18 so as to be in essentially parallel relation to one another, although each is preferably slightly curved to complement the curved peripheral configuration of the non-conductive pipe segment in which the plates are mounted. The plates 26a are electrically connected to the remaining portion of the control circuit 25 by a pair of conductors 28 that are confined within a suitable conduit member 29.

Referring to the embodiment of the control circuit 25 that is disclosed in FIGURE 2, the capacitor defining plate members 26a are connected in series with a variable inductor 31 and a conventional full wave, diode rectifier network 32. A normally de-energized relay 33 is connected across the diagonal output terminal 32a of the rectifier network. This series circuit is connected across the secondary of a conventional input transformer network 34 that supplies an A.C. input signal to the serially connected L–C and bridge circuits, and to a controlled output circuit 35 that is connected in parallel with these serially connected circuits.

In this connection, the series L–C circuit and the bridge network 32 are connected in parallel with a normally open contact 33a of the relay 33 and an energizing coil 36 that controls the actuation of the normally closed solenoid valve 22 (FIGURE 1). As peviously described, the solenoid valve 22 dictates the operation of an ejecting cycle of the sewage handling apparatus in response to a signal which indicates that the receptacle 13 has become filled.

Referring more specifically to the operation of the sewage handling apparatus as dictated by the control circuit 25, sewage is delivered to the receiving receptacle 13 through the conduit 14 including the check valve 14a. As the receptacle 13 is being filled, the check valve 14a limits the inlet flow rate so that the amount of liquid passing into the receiving receptacle does not completely fill the portion of the conduit 18 lying between the capacitor defining plate members 26a. By thus limiting the inlet flow rate and by appropriately selecting the input frequency and the setting of the variable inductor 31, the series L–C circuit defined by the capacitor 26 and inductor 31 normally (i.e. when the receiving receptacle is not filled) provides a substantial amount of series impedance to current flow. In accordance with the invention, the normal series impedance afforded by these components precludes the relay 33 from being energized.

However, the capacitor 26 and the inductor 31 are further selected so that this circuit achieves a resonant condition at the frequency of the applied input signal when the portion of the conduit 18 (or the connecting joint 17) that accommodates the plate members 26a is completely filled with sewage. When this resonant condition occurs, the series impedance offered by the capacitor 26 and the inductor 31 is a minimum value, and a maximum amount of rectified current is supplied to the relay 33 through the diode bridge network 32. This maximum current condition results in the relay 33 being energized and the normally open contact 33a thereof being closed so as to complete a path for energizing current flow from the secondary of the transformer 34 to the coil 36 for the solenoid valve 22.

When the coil 36 is energized, the solenoid valve 22 opens to allow the controlled passage of pressurized air from the storage chamber 12 to the receiving receptacle 13. The build-up of a pressure head within the receptacle 13 causes the accumulated sewage to be discharged at a high rate of flow through the discharge conduit 16 including check valve 16a. Because the open, lower end of the conduit 18 is maintained in close proximity with the bottom of the receptacle 13, only liquid is discharged at a high flow rate through this conduit as the receptacle is emptied. Accordingly, the segment of the sewage discharge path lying between the capacitor defining plate members 26a remains substantially filled with liquid. Accordingly, the resonant control circuit condition is maintained and the solenoid valve remains actuated until substantially all of the liquid is discharged from the receptacle 13. When the outflow of liquid diminishes as the receiver 13 achieves an empty condition, the series resonant control circuit condition no longer exists (i.e., the dielectric characteristic of the region between the plate members is markedly changed) and the relay 33 becomes de-energized. Consequently, the contact 33a returns to the normally open condition and the energizing circuit for the solenoid valve 22 is again interrupted.

The embodiment of the sewage discharge control circuit depicted in FIGURE 4 is functionally similar to the embodiment illustrated in FIGURE 2, with corresponding components being designated by like but primed numerals. This control circuit 25' is designed to dictate the controlled discharge of accumulated sewage from a conventional wet well 40 as illustrated in FIGURE 3 by selectively actuating suitable pumping means. In this connection, the wet well 40 is depicted as being formed by a concrete enclosure 41 which, in a conventional manner, accommodates an inlet pipe 42 in an upper portion of the concrete sidewall thereof. A pair of outlet pipes 43 are similarly provided in the lower portion of the enclosure 41 so as to communicate with the lower-most portion of the sewage accumulating chamber 41a that is defined by the enclosure. although not shown, the outlet pipes 43 are linked to conventional suction pumps that are selectively actuated in response to the operation of the control circuit 25' (FIGURE 4) so that sewage is selectively discharged through one or both of the outlet pipes 43 in accordance with the level of liquid within the chamber 41a.

As shown in FIGURE 4, the circuit 25' includes a plurality of serially connected variable inductor and rectifier networks. These series units are connected in parallel, and this parallel combination of networks is connected in series with a single sensing capacitor 26' to provide four separate pump control circuits. The capacitor 26' forms a first pump control circuit with a variable inductor 31' and a bridge network 32', a second pump control circuit with a second variable inductor 31'' and bridge network 32'', etc. To effect the controlled discharge of sewage from the conventional dual outlet pipe wet well 40, one pair of control circuits is employed as a pair of pump actuating control circuits and the other two are utilized as pump stopping control circuits.

Referring again to FIGURE 3, the sensing capacitor 26' utilized in this embodiment of the invention and incorporated in the control circuit 25' is preferably comprised of a pair of elongated and insulated, parallelly-arranged capacitor plates 26a'; although a single plate arrangement might also be employed. As shown, the capacitor plates 26a' are preferably supported from a mounting means 44 that extends into the upper portion of the chamber 41a. This mounting means preferably includes suitable conduits for accommodating the necessary electrical connections for the capacitor plates 26a', which connections link the plates to the remaining portion of the control circuit 25'.

Because of the disposition and elongated configuration of the capacitor plates 26a' (i.e. a spacing of approximately 4'' is preferably maintained between these parallel plates to compensate for possible sludge accumulations and the like), the impedance of the sensing capacitor 26' which is formed by these plates varies in direct proportion to variations in the level of the liquid within the chamber 41a. Accordingly, the inductor 31' is individually selected so that a first of the pumps is turned on (i.e., a series resonant circuit condition is created in the first pump actuating control circuit) as the level of liquid rises to a first height, designated by the line X in FIGURE 3, and accumulated liquid is discharged through one of the outlet pipes 43. Similarly, the inductor 31'' is selected so that the second pump associated with the other outlet pipe 43 is turned on as the liquid rises above the line X and approaches an upper liquid level condition, designated by the line Y. To control the shut-off of the pumps after a desired amount of sewage has been ejected from the enclosure, the inductors of the other pump control circuits are selected so that the high level pump will be turned off when the level Y' is reached and the low level pump will be turned off when the level X' is reached during an ejecting operation.

In a conventional manner, the first and second control circuits are interconnected with the pump actuating circuitry (not shown) so that the pumps remain in an operative state once actuated until the other pump control circuits cause these units to be deactivated. This can be effected by having the contacts of the relays 33′, 33″, etc. connected in the pump control circuits. Preferably, a conventional locking circuit is then completed to maintain the pump in an energized state even though the series-resonant pump control circuit condition no longer exists and the corresponding relay is de-energized, as will occur as the level of liquid drops in response to pump operation. Obviously, the details of the pump control operation are dictated by the specific type of pump control circuit, it being understood that the contacts of the control relays 33′, 33″, etc. can be readily incorporated into any such circuit.

The operation of the control circuit 25′ in conjunction with the embodiment of the sewage handling apparatus shown in FIGURE 3 is generally similar to that of the control circuit shown in FIGURE 2. In this connection, sewage is supplied to the wet well 40 and accumulates in the chamber 41a. As the liquid reaches the level designated X, the capacitance of the sensing capacitor formed by the elongated, parallelly-disposed plates 26a is such that a resonant condition is created in the circuit including the capacitor 26′, the inductor 31′, and the bridge network 32′. As a result, sufficient current is supplied to the relay 33′ to cause the "low level" discharge pump to be actuated, thereby effecting the discharge of accumulated sewage through a first of the outlet pipes 43.

If the inlet flow rate is such that the level of liquid continues to rise to the level Y, the capacitance of the sensing capacitor 26′ varies in direct proportion to the resultant variations in the dielectric characteristic of the medium between a larger area of the parallel plates 26a′. Consequently, a resonant circuit condition is created in the network including the sensing capacitor 26′, the inductor 31″, and energizing current is supplied through the bridge network 32″ to the control relay 33″. When the relay 33″ is energized, an operating circuit for the second of the discharge pumps is completed and locked in an operative condition so that sewage is also discharged from the other of the outlet pipes 43 under the control of this second pump. As the level of liquid is reduced by the pump operation under the control of the pump actuating circuits, which are energized in response to the actuation of the relays 33′ and 33″, the capacitance of the sensing capacitor 26′ varies accordingly. As the "low" liquid level conditions are reached, the relays 33‴ and 33⁗ are successively energized to interrupt the corresponding pump operation at the levels Y′ and X′, respectively.

In one functioning embodiment of the control circuit 25, an A.C. input signal having a frequency of 10 kc. yielded the necessary milliamp current (i.e., approximately $5 \times 10^{-3}$ amps is desirable) to actuate the control relay when the resonant control circuit condition was achieved. Accordingly, it will be appreciated that the present invention provides an improved, highly reliable, and efficient means for yielding the controlled operation of the sewage discharge mechanism of sewage handling apparatus. Since the controlled operation of the discharge mechanism stems from the variable impedance characteristics of a sensing element that is uninfluenced by the build-up of grease and other materials thereon, the reliability of the control is enhanced. Moreover, by selecting the control components with proper response characteristics, the rapid and efficient ejection of sewage is effected when the level thereof reaches a preselected point and premature ejecting cycles are avoided, thereby further enhancing the sensitivity and efficiency of the controlled apparatus.

It will be appreciated that the foregoing description of two embodiments of the invention is merely illustrative of the novel features and applicability of the invention to controlled sewage handling apparatus. Modifications of the embodiments previously described might be devised by those skilled in the art without departing from the invention, various features of which are set forth in the accompanying claims.

What is claimed is:

1. In controlled sewage handling apparatus which includes means for receiving sewage, selectively actuable means for effecting the discharge of sewage from said receiving means and through said outlet means, and a control circuit for selectively actuating said discharge effecting means in accordance with the level of sewage within said receiving means, said control circuit including a source of current, and current responsive switching means for operating said discharge effecting means when said switching means is energized, the combination thereof with a pair of serially connected variable impedance elements connecting said switching means in circuit with said current source, a first of said variable impedance elements being selectively adjustable to provide a predetermined impedance characteristic, a second of said variable impedance elements being associated with said sewage receiving means so that the impedance of said second element varies with variations in the level of sewage within said receiving means, said series combination of elements providing minimum impedance to energizing current flow from said source and to said switch means when the sewage accumulated in said receiving means reaches a preselected level.

2. Apparatus in accordance with claim 1 wherein said first variable impedance element is a selectively variable inductor and said second variable impedance element is a sensing capacitor and wherein a resonant condition is created in the series circuit formed by said elements when the sewage accumulated in said receiving means reaches a preselected level.

3. A circuit for effecting the controlled ejection of sewage holding apparatus including means for receiving sewage, means defining a sewage inlet to said receiving means, means defining a sewage outlet from said receiving means, and selectively actuable means for effecting the discharge of sewage from said receiving means and through said outlet means; which control circuit comprises a source of current, a current responsive switching means for operating said discharge effecting means when said switching means is energized, and a pair of serially connected variable impedance elements connecting said switching means in circuit with said current source, a first of said variable impedance elements being selectively adjustable to provide a predetermined impedance characteristic, a second of said variable impedance elements being associated with said sewage receiving means so that the impedance of said second element varies with variations in the level of sewage within said receiving means, said series combination of elements providing minimum impedance to energizing current flow from said source and to said switch means when the sewage accumulated in said receiving means reaches a preselected level.

4. A circuit in accordance with claim 3 wherein said first variable impedance element is a selectively variable inductor and said second variable impedance element is a sensing capacitor and wherein a resonant condition is created in the series circuit formed by said elements when the sewage accumulated in said receiving means reaches a preselected level.

5. In a circuit for effecting the controlled ejection of sewage from sewage holding apparatus, which circuit includes a source of current and a current responsive switching means for operating discharge effecting means in said apparatus when said switching means is energized, the combination thereof with a pair of serially connected variable impedance elements connecting said switching means in circuit with said current source, a first of said variable impedance elements being selectively adjustable to provide a predetermined impedance characteristic, a second of said variable impedance elements being associated with sewage receiving means in said apparatus so that the impedance of said second element varies with variations in the level of sewage within said receiving means, said series combination of elements providing minimum impedance to energizing current flow from said source and to said switch means when the sewage accumulated in said receiving means reaches a pre-selected level.

6. A circuit in accordance with claim 5 wherein said first variable impedance element is a selectively variable inductor and said second variable impedance element is a sensing capacitor and wherein a resonant condition is created in the series circuit formed by said elements when the sewage accumulated in said receiving means reaches a pre-selected level.

References Cited

UNITED STATES PATENTS

| | | | |
|---|---|---|---|
| 2,238,610 | 4/1941 | Thomas | 324—61 |
| 2,523,363 | 9/1950 | Gehman | 226—127 |
| 2,817,299 | 12/1957 | Weis | 103—241 |
| 2,884,948 | 5/1959 | Weiss | 137—392 |
| 2,950,601 | 8/1960 | Wightman | 340—236 |
| 3,118,391 | 1/1964 | Ciabattari et al. | 103—240 |
| 3,246,180 | 4/1966 | Keeney | 340—244 |
| 3,275,021 | 9/1966 | Loveless | 103—240 |

DONLEY J. STOCKING, *Primary Examiner.*

W. J. KRAUSS, *Assistant Examiner.*

UNITED STATES PATENT OFFICE
CERTIFICATE OF CORRECTION

Patent No. 3,342,138 September 19, 1967

John W. Parks et al.

It is hereby certified that error appears in the above numbered patent requiring correction and that the said Letters Patent should read as corrected below.

Column 3, line 15, for "peviously" read -- previously --; column 6, line 35, after "sewage" insert -- from sewage --.

Signed and sealed this 15th day of October 1968.

(SEAL)
Attest:

Edward M. Fletcher, Jr.  EDWARD J. BRENNER
Attesting Officer  Commissioner of Patents